United States Patent
Bartram

(10) Patent No.: US 6,257,681 B1
(45) Date of Patent: Jul. 10, 2001

(54) BRAKING SYSTEM

(75) Inventor: Michael J. Bartram, Nuneaton (GB)

(73) Assignee: Dunlop Aerospace Limited, Coventry (GB)

( * ) Notice: Subject to any disclaimer, the term of this patent is extended or adjusted under 35 U.S.C. 154(b) by 0 days.

(21) Appl. No.: 09/373,550

(22) Filed: Aug. 13, 1999

(30) Foreign Application Priority Data

Aug. 15, 1998 (GB) .................................................. 9817757

(51) Int. Cl.$^7$ ...................................................... B60T 8/86
(52) U.S. Cl. ............................... 303/126; 303/4; 244/111
(58) Field of Search .................................. 303/9.61–9.63, 303/1, 3, 8, 15, 16, 20, 42, 43, 113.1, 126; 188/181 C, 181 R, 106 P, 354, 3 R, 3 H; 244/111

(56) References Cited

U.S. PATENT DOCUMENTS

| 4,971,179 | 11/1990 | Gebhardt et al. . |
| 4,986,610 | 1/1991 | Beck et al. . |
| 5,403,072 | 4/1995 | Kilian et al. . |
| 5,417,477 | * 5/1995 | Lasbleis ..................................... 303/3 |
| 5,505,531 | * 4/1996 | Griffith ................................... 303/126 |
| 5,845,975 | * 12/1998 | Wells ..................................... 303/126 |

FOREIGN PATENT DOCUMENTS

| 0 247 253 | 12/1987 | (EP) . |
| 0 443 213 | 8/1991 | (EP) . |
| 2 216 209 | 10/1989 | (GB) . |

* cited by examiner

Primary Examiner—Christopher P. Schwartz
Assistant Examiner—C. T. Bartz
(74) Attorney, Agent, or Firm—Nixon & Vanderhye P.C.

(57) ABSTRACT

In a braking system including a plurality of independently operable hydraulic brake assemblies, a controller is provided for monitoring the hydraulic pressure at at least some of the brake assemblies and for comparing that pressure with a brake control demand signal so that all or substantially all brake assemblies can be brought into operation if that comparison indicates a requirement for additional or full braking operation.

10 Claims, 1 Drawing Sheet

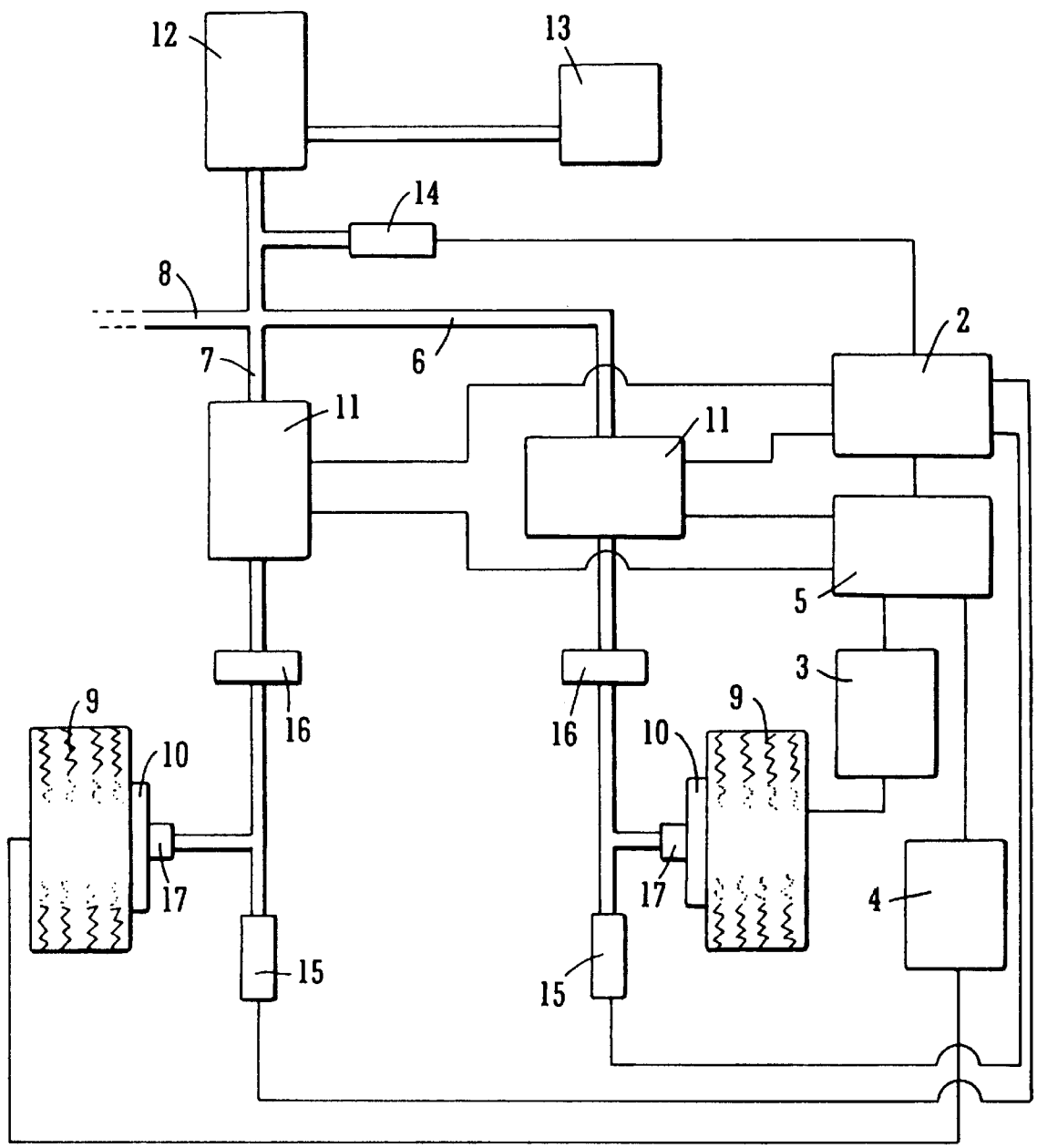

BRAKING SYSTEM

BACKGROUND

The present invention relates to a braking system suitable for an aircraft and a method for the control of a braking system comprising a plurality of brake assemblies at least one of which is operable independently of the other or another of the brake assemblies. The invention relates also to a brake control system for the control of a plurality of carbon brakes and to a braking system such as an aircraft braking system comprising a plurality of carbon brakes and to a braking system such as an aircraft braking system comprising a plurality of carbon brakes rakes operatively associated with the brake control system.

The term carbon brake is used to mean a brake assembly having friction discs of a carbon-carbon composite material comprising a carbon fiber reinforcing material within a carbon matrix.

The ability to stop an aircraft both quickly and economically is of great importance and enormous amounts of kinetic energy have to be dissipated in order to bring a moving aircraft to rest, particularly in RTO (refused or rejected take-off) situation. The aircraft velocity may be decreased and the kinetic energy thereby dissipated by drag forces, by application of the engine thrust reversers and by application of the aircraft wheel brakes. The drag forces can be increased by deploying of airbrakes or speed brakes on the aircraft wings.

However, very high energy brake applications in an RTO situation are fortunately rare events and therefore play little, if any, part in determining overall brake operating economics.

It is now recognized that the rate of wear of carbon brake discs is not proportional to the energy dissipated during the time the brakes are applied, brake wear being disproportionately high when energy input to the brake is low. Consequently it is beneficial to apply only a restricted number of the available brakes when the required braking action is relatively low.

The concept of applying only limited numbers of brakes during taxiing operations but all the available brakes in a landing run has already been disclosed in GB 2216209B and U.S. Pat. No. 4,097,610. The concept has been described variously as brake disabling, selective braking or as taxi-brake select.

That concept has been developed by the teaching of GB 2289734 which describes a cascade operation. In the cascade operation the number of brake assemblies actuated is dependent on the pilot's pedal pressure demand and can increase, or decrease, as the pilot's demand increases or decreases.

In some circumstances a condition can arise in which it would be undesirable to employ or continue with selective braking, either simple selective braking as in GB 2216209 or cascade braking as in GB 2289734. Examples of conditions when simple selective or cascade braking might be undesirable include occasions when a skid condition is detected and when a hydraulic fuse has blown.

SUMMARY OF THE INVENTION

This invention has as an object the provision of means and a method whereby selective braking is inhibited when there arises a condition, especially a randomly occurring condition, that requires or renders prudent the operation of all brake assemblies.

According to one aspect of the invention, there is provided a selective braking system comprising a plurality of brake assemblies, each comprising brake actuation means: braking demand signal supply means for supplying a signal indicative of a demanded level of braking to be provided by the system; drive signal supply means connected to each brake actuation means and the braking demand signal supply means and operable for supplying drive signals to the brake actuation means to operate the respective braking assemblies; control means coupled to the drive signal supply means and operable for selectively operating said brake assemblies; and monitoring means connected to the drive signal supply means and said control means and operable for monitoring the drive signal received by each brake actuation means with reference to the said braking demand signal and, at times, for causing the control means to become operable for the brake assemblies to be operated concurrently.

Each brake actuation means may be hydraulically operable and the drive signal supply means may comprise hydraulic pressure supply means connected to each actuation means.

According to a second aspect of the invention there is provided a selective braking system comprising a plurality of hydraulically operable brake assemblies, each brake assembly comprising brake actuation means: braking demand signal supply means for supplying a signal indicative of a demanded level of braking to be provided by the system; hydraulic pressure supply means connected to the actuation means and the braking demand signal supply means and operable for supplying hydraulic pressure to the brake actuation means to operate the braking assembly; control means couples to the hydraulic pressure supply means and operable for selectively operating said brake assemblies; monitoring means connected to the hydraulic pressure supply means and said control means and operable for monitoring the hydraulic pressure received by the brake actuation means with reference to the braking demand signal and, at times, for causing the control means to become operable for the brake assemblies to be operated concurrently.

In accordance with another of its aspects the present invention provides a braking system comprising a plurality of hydraulically operable brake assemblies at least one of which is operable independently of the other or another brake assembly of the plurality, control means for monitoring the hydraulic pressure at at least some of the brake assemblies and comparing the pressure with a brake control demand signal, and override means to cause operation of all or substantially all of the brake assemblies if comparison of the monitored hydraulic pressure with the brake control demand signal indicates a requirement for all or substantially all of the brake assemblies to be operated simultaneously.

The invention provides also a brake control system for use in the braking system and method aspects of the invention.

The brake control demand signal may, for example, be a hydraulic signal derived from a pilot's brake pedal pressure, or an electronic signal from a brake control device especially in the case of a fly-by-wire type aircraft.

The control means may, for example monitor hydraulic pressure at a position between a hydraulic anti-skid control valve and a brake actuation piston. The monitor position may be between a hydraulic fuse and a brake actuation piston.

In accordance with another of its aspects the present invention provides a method for the control of a braking system comprising a plurality of hydraulically operable brake assemblies at least one of which is operable independently of the other or another of the brake assemblies wherein the hydraulic pressure at at least some of the brake assemblies is monitored and compared with a brake control dement signal, and a system condition which inhibits at least one of the brake assemblies from operating during a braking condition is over-ridden at least in part whereby all or substantially all brake assemblies are brought into operation when comparison of a monitored brake assembly hydraulic pressure with a brake control dement signal indicates a requirement for all or substantially all of the brake assemblies to be operated simultaneously.

In consequence of the invention it is therefore possible to provide that fewer brakes are inhibited than otherwise would be the case, or that all brakes are in operation during the occurrence of anti-skid activity or failure of a hydraulic fuse or, more generally, a pressure drop resulting from a failure of a component or hydraulic line at a position between a anti-skid valve and a brake assembly.

BRIEF DESCRIPTION OF THE DRAWING

An embodiment of the invention is now described by way of example and with reference to the accompanying drawing, the single FIGURE of which is a schematic diagram of part of an aircraft braking system which incorporates selective braking control.

DETAILED DESCRIPTION OF PREFERRED EMBODIMENTS

The drawing shows a pair of wheels 9 on one side of an aircraft (not shown). The aircraft has another pair of wheels (not shown) at the other side of the aircraft and, depending upon the particular aircraft, it could comprise further wheels (not shown). By way of example, a large aircraft might comprise, as well as a nose wheel, two bogeys (or trucks) at each side of the aircraft and each carrying four wheels. Each wheel 9 and, apart from the nose wheel, each other wheel of the aircraft is provided with a carbon disc brake 10 having a hydraulic actuator 17 comprising one or more piston and cylinder assemblies (not separately shown). To control the brakes 10, hydraulic pressure is applied via hydraulic lines 6, 7 and 8 to the actuators 17 from a brake control valve 12, the valve 12 being responsive to a braking demand signal supply means 13 which incorporates a brake master cylinder and pilot's brake pedal, (neither of these two latter items being separately shown).

The valve 12 and the demand signal supply means 13 are common to the other pair of aircraft wheels, the hydraulic pressure being supplied to the brakes of this other pair of wheels via the hydraulic line 8.

The supply lines 6 and 7 leading from the valve 12 to the respective actuators 17 each incorporate an anti-skid valve 11 and a hydraulic fuse 16. The anti-skid valves 11 are controlled by an anti-skid control circuit 5 driven by wheel speed signals supplied by speed sensors 3 and 4. If the speed of either wheel 9 falls to a level indicating that the wheel is or is about to become locked, the circuit 5 controls the appropriate valve 11 to dump hydraulic pressure supplied from valve 12 and reduce the braking effort applied to that wheel, i.e. so as to override the demand signal as far as that wheel is concerned.

The anti-skid valves 11 are also controlled by a selective braking control circuit 2 which, by preventing the application of hydraulic pressure to one or the other actuator 17, is able to operate the brakes 10 selectively, provided that certain conditions are met. For example, during taxiing, the two brakes may operate alternately in response to successive depressions of the pilot's brake pedal but only while the aircraft is travelling at an appropriate speed. The selective braking control circuit 2 is supplied with a signal indicative of the aircraft speed by the anti-skid braking control circuit 5, the signal being formed in the circuit 5 by processing appropriately the signals from the sensors 3 and 4.

Another condition taken into account by the control circuit 2 is the presence of anti-skid activity by circuit 5, i.e. when one or the other valve 11 is operating to reduce the hydraulic pressure applied to the respective actuator 17 compared with the pressure appropriate to the demanded braking effect. This condition is sensed by the control circuit 2 by comparing the signal received from each of two pressure transducers 15 which are connected to the hydraulic lines 6 and 7 at or close to the respective actuators 17 against a signal received from another pressure transducer 14 which is couples to the output of the control valve 12. If the comparison does show the presence of anti-skid activity, the control circuit 2 is inhibited from carrying out selective braking and instead the valves are operated concurrently.

The comparison of the pressure at the output of the valve 12 with that at each actuator 17 can also be indicative of reduced pressure or a supply failure at one o the other actuator, for example, due to operation of one of the hydraulic fuses 16. This is also a condition which predicates inhibition of selective braking and the control circuit 2 acts accordingly.

Similarly, it may be appropriate to inhibit selective braking if the braking dement signal is above a particular level, i.e. if the pilot brake pedal has been pressed harder than might be expected during taxiing. This condition can be determined by the control circuit by reference to the signal from transducer 14.

It will be appreciated that the system illustrated could be modified, for example, transducer 14 could be coupled to the line between the demand signal supply means 13 and the valve 12. Also, the braking demand signal supply means could comprise electronic control apparatus which produces an electronic demand signal for controlling the valve 12. In that case, the transducer 14 could remain as shown or it could be omitted and the electronic demand signal could be tapped off direct to the circuit 2.

Instead of the anti-skid valves 11 being used to provide selective braking under the control of circuit 2, there could be respective separate valves (not shown) series connected in the lines 6 and 7. These separate valves are then controlled by circuit 2 while the anti-skid valves 11 remain controlled by the circuit 5.

The aircraft speed signal for the circuit 2 could be formed other than by the anti-skid circuit 5.

The selective braking control circuit 2 could be common to the brakes of the other pair of aircraft wheels with further signal inputs being supplied to it from pressure transducers (not shown) such as 15 coupled to the actuators of those other wheels, and with further outputs supplied to anti-skid valves (not shown) such as 11 in the hydraulic lines to the actuators of the other wheels. Alternatively, the circuit 2 could be duplicated for the other pair of wheels and appropriate means could be provided for synchronizing the two circuits 2.

Similarly, where there are more than two pairs of wheels, there could be a common control circuit or the circuit could be replicated as appropriate. Patent number GB 2216209 shows a system where the control circuit is common to two pairs of wheels and corresponding valves.

There could be two pilot brake pedals for braking wheels on respective sides of the aircraft to achieve brake assisted steering of the aircraft. For this, the demand signal supply means 13 and the control valve 12 could be duplicated for the wheels on the other side of the aircraft while the hydraulic line 8 is omitted din favor of separate lines (not shown) leading from the duplicated control valve 12 to the brakes on the other wheels. Alternatively, the supply means 13 and valve 12 could comprise a more complex tandem arrangement for driving all the brakes. In fact, as will be appreciated by those skilled in the art, the system is illustrated only diagrammatically and in simplified form and, at least for a larger passenger aircraft, is anyway likely to be somewhat more complex than is shown. For example, hydraulic return lines may be needed (as shown in Patent No. GB 2216209) and the system and/or at least some of its components may be duplicated to give a desired level of redundancy.

What is claimed is:

1. A selective braking system comprising:

a plurality of brake assemblies, each brake assembly comprising hydraulically operable brake actuation means;

braking demand signal supply means for supplying a brake demand signal indicative of a demanded level of braking to be provided by the system;

hydraulic pressure supply means including a brake control valve connected to the braking demand signal supply means and for each brake assembly, an anti-skid valve connected between the brake control valve and the respective actuation means, the brake control valve being operable for responding to said brake demand signal to supply hydraulic pressure individually to each of the brake actuation means via the respective anti-skid valves to operate the respective braking assemblies;

control means couples to the hydraulic pressure supply means and operable for selectively operating said brake assemblies; and monitoring means connected to the hydraulic pressure supply means and said control means and operable for monitoring the hydraulic pressure between each anti-skid valve and the corresponding brake actuation means with reference to said braking demand signal and, at times, for causing the control means to become operable for the brake assemblies to be operated concurrently.

2. System according to claim 1, including skid condition sensing means connected to said anti-skid valves for operating the anti-skid valves to counteract the skid condition, the control means being operable for selectively operating the brake assemblies and, at times, for ensuring only concurrent operation of the brake assemblies in dependence upon signals supplied by the skid condition sensing means as well as the monitoring means.

3. System according to claim 1, wherein the hydraulic pressure supply means comprises a respective hydraulic fuse connected between each anti-skid valve and the corresponding brake actuation means and the monitoring means is operable to monitor hydraulic pressure at a position between each hydraulic fuse and the corresponding brake actuation means.

4. System according to claim 1, wherein the monitoring means includes a pressure transducer connected to an output of the brake control valve for providing to said control means information representative of the brake control demand signal.

5. Method for the control of a braking system comprising a plurality of hydraulically operable brake assemblies at least on of which is operable independently of the other or another of the brake assemblies wherein the hydraulic pressure of at least some of the brake assemblies is monitored and compared with a brake control demand signal, and a system condition which inhibits at least one of the brake assemblies from operating during a braking condition is over-ridden at least in part whereby all or substantially all brake assemblies are brought into operation when comparison of a monitored brake assembly hydraulic pressure with a brake control demand signal indicates a requirement for all or substantially all of the brake assemblies to be operated simultaneously.

6. Method according to claim 5, wherein hydraulic pressure is monitored at a position between a hydraulic anti-skid valve and a brake actuation piston.

7. Method according to claim 5, wherein hydraulic pressure is monitored at a position between a hydraulic fuse and a brake actuation piston.

8. Method according to claim 7, wherein the pressure is monitored at a position between a brake control valve and an anti-skid control valve in order to derive a signal representative of a brake control demand signal.

9. Method according to claim 5, wherein all or substantially all brake assemblies are brought into operation when there is at least a predetermined minimum difference between the monitored hydraulic pressure of at least one brake assembly and the brake control demand signal.

10. A selective braking system comprising:

a plurality of brake assemblies, each brake assembly comprising a hydraulically operable brake actuator;

a braking demand signal supply assembly that supplies a brake demand signal indicative of a demanded level of braking to be provided by the system;

a hydraulic pressure supply device including a brake control valve connected to the braking demand signal supply assembly and for each brake assembly, an anti-skid valve connected between the brake control valve and the respective actuator, the brake control valve being operable for responding to said brake demand signal to supply hydraulic pressure individually to each of the brake actuators via the respective anti-skid valves to operate the respective braking assemblies;

a controller coupled to the hydraulic pressure supply device and operable for selectively operating said brake assemblies; and a monitoring circuit connected to the hydraulic pressure supply device and the controller and operable for monitoring the hydraulic pressure between each anti-skid valve and the corresponding brake actuator with reference to said braking demand signal and, at times, for causing the controller to become operable for the brake assemblies to be operated concurrently.

* * * * *